United States Patent [19]

Staniland

[11] 4,331,798

[45] May 25, 1982

[54] PRODUCTION OF AROMATIC POLYETHERS WITH INFUSIBLE PARTICULATE SUBSTANCE

[75] Inventor: Philip A. Staniland, Tewin Wood, England

[73] Assignee: Imperial Chemical Industries Limited, London, England

[21] Appl. No.: 77,476

[22] Filed: Sep. 20, 1979

Related U.S. Application Data

[63] Continuation-in-part of Ser. No. 4,532, Jan. 18, 1979, abandoned.

[51] Int. Cl.$^3$ .................... C08G 8/02; C08G 75/20
[52] U.S. Cl. .................................. 528/125; 528/126; 528/128; 528/174
[58] Field of Search ................ 528/125, 126, 128, 174

[56] References Cited

U.S. PATENT DOCUMENTS

| | | | |
|---|---|---|---|
| 3,886,120 | 5/1975 | Yagi et al. | 528/125 |
| 4,105,635 | 8/1978 | Freeman | 528/125 |
| 4,105,636 | 8/1978 | Taylor | 528/125 |
| 4,200,727 | 4/1980 | Blinne et al. | 528/125 |

*Primary Examiner*—Harold D. Anderson
*Attorney, Agent, or Firm*—Cushman, Darby & Cushman

[57] ABSTRACT

Production of aromatic polyethers by reacting (i) a mixture of a bisphenol and a dihalobenzenoid compound or (ii) a halophenol, in which dihalobenzenoid compound or halophenol the halogen atoms are activated by ortho or para —SO$_2$— or —CO— groups, with an alkali metal (bi)carbonate, wherein the reaction is carried out in the absence of a solvent and in the presence of an infusible particulate support substance, preferably inorganic or polymeric, yielding a reaction medium in the form of a free-flowing powder by the end of the reaction.

16 Claims, No Drawings

PRODUCTION OF AROMATIC POLYETHERS WITH INFUSIBLE PARTICULATE SUBSTANCE

This application is a continuation-in-part of our application Ser. No. 4532 filed Jan. 18, 1979, now abandoned.

The present invention relates to the production of aromatic polyethers and in particular to the production of aromatic polyethers containing sulphone and/or ketone linkages (termed hereinafter aromatic polyethersulphones and polyetherketones according to whether the sulphone or ketone linkages preponderate).

It has been proposed in Canadian Pat. No. 847 963 to make such polymers by reacting a bisphenol and a dihalobenzenoid compound, or a halophenol, in which dihalobenzenoid compound or halophenol the halogen atoms are activated by $-SO_2-$ or $-CO-$ groups ortho or para thereto, with an alkali metal carbonate or bicarbonate in the presence of the liquid phase of a sulphoxide or sulphone reaction solvent. In United Kingdom patent specification No. 1,264,900 a similar process is described employing a polar reaction solvent and using potassium carbonate as the alkali metal carbonate. Also in Japanese patent publication No. 53-12991 there is described a process for making such polymers by reacting the bisphenol, dihalobenzenoid compound and alkali metal carbonate or bicarbonate in the absence of a solvent.

While such processes are very effective for the production of aromatic polyethers, the reaction product at the end of the polycondensation reaction is very sticky and viscous, and on removal from the reaction vessel leaves an adherent residue which must be removed before the vessel can be re-used. Also such a reaction product normally requires a comprehensive and expensive work-up procedure to isolate the aromatic polyether in an acceptable state, e.g. involving milling the product and several washings with water and/or the use of expensive solvents.

A process has now been discovered which can yield a reaction product which may be discharged cleanly from the reaction vessel and from which the polyarylene ether can be isolated exceptionally easily in comparison to the above-described processes.

According to the present invention there is provided a process for the production of an aromatic polyether containing $-SO_2-$ and/or $-CO-$ linkages comprising heating (i) a substantially equimolar mixture of (a) at least one bisphenol and (b) at least one dihalobenzenoid compound, or (ii) at least one halophenol, in which dihalobenzenoid compound or halophenol the halogen atoms are activated by $-SO_2-$ or $-CO-$ groups ortho or para thereto, with at least one alkali metal carbonate or bicarbonate to effect a polycondensation reaction to form the aromatic polyether the amount of carbonate or bicarbonate being such that there is at least one alkali metal atom for each phenol group present, wherein the polycondensation reaction is carried out in the absence of a solvent and in the presence of sufficient of an infusible (under the conditions of reaction) particulate support substance for the polyether so as to yield a reaction medium in the form of a free-flowing powder by the end of the polycondensation reaction.

An advantageous characteristic of the process of the invention is that the reaction vessel normally discharges cleanly—this applies even to glass reaction flasks—and may often be used repeatedly without interbatch cleaning. The process does not involve the use of a solvent and isolation of the polyaromatic ether may be effected exceptionally rapidly and easily (and therefore cheaply), e.g. by a short and simple sequence of water washes in which the isolated polymer is obtained in the form of a readily filterable powder and requires no milling or classification. Such a polymer powder after washing could be very suitable as it stands for subsequent compounding or fabrication processes.

The infusible support substance for the polyaromatic ether is normally inorganic and for ease of work-up is desirably water soluble—although in some cases it may be useful to retain the support with the worked-up polymer in order to produce a highly filled polyaromatic ether; in such cases the support could be e.g. inorganic or polymeric (organic). In many cases, the support substance may simply consist of a large excess (over stoichiometric) of the alkali metal carbonate or bicarbonate. If this should be undesirable, the support substance may be an inert material such as an inert inorganic salt, e.g. an alkali metal halide such as sodium chloride.

The process of the invention may be operated as a batch process or as a continuous process.

The halophenol or bisphenol/dihalobenzenoid compound added initially to the reaction mixture is/are preferably in powder form. In the case of using bisphenol/dihalobenzenoid compound as reactants, it may be advantageous under some circumstances to premix these compounds before addition, e.g. by powder mixing or by melting together followed by comminution into powder.

When operating the process of the invention, it is usual not to include a liquid diluent with the initially charged materials. Under such conditions, the halophenol or bisphenol/dihalobenzenoid compound reactant(s) should be in powder form and the reaction medium is initially a free-flowing powder and little or no change in appearance or behaviour occurs during the polycondensation. In such a system, the viscosity of the reaction medium is initially low and does not alter significantly during the polycondensation; consequently a conventional type of reaction vessel is not essential and a variety of mixers or blenders could be used as the reaction vessel provided they are capable of operation with an inert atmosphere at a temperature sufficiently high for the polycondensation reaction. Thus under such circumstances, a polymerisation plant could consist simply of a heated mixer, a wash vessel and a dryer.

Any type of suitable mixing vessel could be employed; for example it could be a vessel provided with a stirrer or a vessel in which the medium is agitated by the passage therethrough of a gas (e.g. an inert gas such as nitrogen, carbon dioxide, helium or argon, or possibly air) as in a fluid-bed reactor (the gas e.g. could be heated to provide at least part of the heat required for the polymerisation and/or recirculated to take account of any loss of reactant(s) by volatilisation; the gas velocity could e.g. be kept low, again to minimise loss of reactant(s) by volatilisation). Such a gas-agitated reactor could provide good temperature control coupled with efficient mixing. A mixing vessel employing both a stirrer and gas-agitation could also be used.

Optionally, however, the initially charged materials may include an inert liquid diluent such as a hydrocarbon like chlorobenzene. Under such conditions, the reaction medium during the polycondensation is a suspension or paste. The diluent must however have been distilled out of the reaction medium by the end of the polycondensation reaction so as to leave a free-flowing powder like that where no diluent is employed.

Another variant of the process is to include an insoluble material(s) with the initial charge which can remain with the isolated polyaromatic ether as a filler.

During the polycondensation, the aromatic polyether forms as a coating on the support material and hence the diameter of the resulting polymer particles is related to the particle size of the support. The particles at the end of polymerisation filter exceptionally easily and on washing with a suitable liquid (e.g. water where the support is water-soluble) come to resemble envelopes having extremely thin wall sections; this results in very fast leaching (to remove the support if this is desired and other by-products). My experience at the present time is that as few as two water washes (when using a water-soluble support) can yield polymer essentially free of residues.

Preferred bisphenols include hydroquinone and those of formula

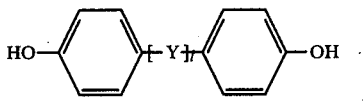

in which 1 is zero or 1, and Y is oxygen, sulphur, —SO$_2$—, —CO—, or a divalent hydrocarbon radical.

Particularly preferred bisphenols include hydroquinone
4,4'-dihydroxybenzophenone
4,4'-dihydroxydiphenylsulphone
2,2'-bis-(4-hydroxyphenyl) propane
4,4'-dihydroxybiphenyl
4,4'-dihydroxydiphenyl sulphide.

The dihalobenzenoid compounds preferably have the formula

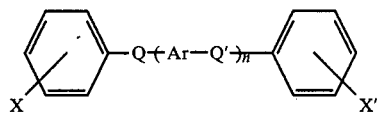

in which X and X', which may be the same or different, are halogen atoms and are ortho or para to the groups Q and Q'; Q and Q', which may be the same or different, are —CO— or —SO$_2$—; Ar is a divalent aromatic radical; and n is 0, 1, 2 or 3.

The aromatic radical Ar is preferably a divalent aromatic radical selected from phenylene, biphenylylene or terphenylylene.

Particularly preferred dihalides have the formula

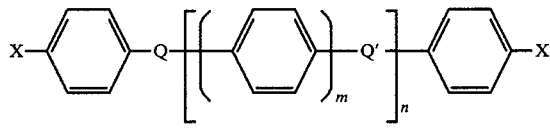

where m is 1, 2 or 3.

Examples of suitable dihalides include
4,4'-dichlorodiphenylsulphone
4,4'-difluorodiphenylsulphone
4,4'-difluorobenzophenone
4,4'-dichlorobenzophenone
4-chloro-4'-fluorodiphenylsulphone
4-chloro-4'-fluorobenzophenone
bis-4,4'-(4-chlorophenylsulphone) biphenyl.

Mixtures of dihalides may be employed so as to produce copolymers. Examples of mixtures that may be employed include 4,4'-dichlorodiphenylsulphone with 4,4'-dichlorobenzophenone or bis-4'-(4-chlorophenylsulphonyl) biphenyl.

Preferred halophenols are those of formula

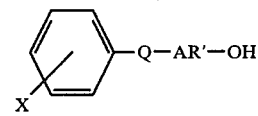

wherein X is halogen and is ortho or para to Q, Q is —SO$_2$— or —CO—, and Ar' is an aromatic radical, and —OH is preferably para to the group Q.

The aromatic radical Ar' is preferably a divalent aromatic radical selected from phenylene, biphenylylene, and radicals of the formula

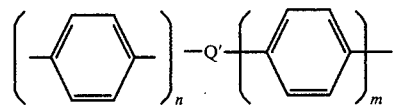

where Q' is —CO— or —SO$_2$— and n and m, which may be the same or different are integers selected from 1, 2 and 3.

Particularly preferred halophenols have the formula

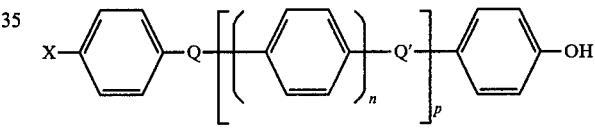

where p is 0 or 1.

Examples of suitable halophenols include
4-(4-chlorophenylsulphonyl) phenol
4-(4-fluorophenylsulphonyl) phenol
4-(4-chlorobenzoyl) phenol.
4-hydroxy-4'-(4-chlorophenylsulphonyl) biphenyl
4-(4-hydroxyphenylsulphonyl)-4'-(4-chlorophenyl sulphonyl) biphenyl.

Mixtures of halophenols may be employed so as to produce copolymers. Examples of mixtures that may be employed include 4-(4-chlorophenylsulphonyl) phenol with 4-(4-chlorobenzoyl) phenol, 4-hydroxy-4'-(4-chlorophenyl sulphonyl) biphenyl, or 4-(4-hydroxyphenylsulphonyl)-4'-(4-chlorophenylsulphonyl) biphenyl.

Equally mixtures of one or more halophenols with a substantially equimolar mixture of a dihalide and bisphenol may be employed. As an example there may be mentioned 4-(4-chlorobenzoyl) phenol in admixture with 4,4'-dichlorodiphenylsulphone and 4,4'-dihydroxydiphenylsulphone.

The polycondensation is conducted using the at least one alkali metal carbonate or bicarbonate as defined. The at least one alkali metal carbonate or bicarbonate is preferably selected from sodium carbonate, sodium bicarbonate, potassium carbonate, potassium bicarbonate, rubidium carbonate and caesium carbonate. The at least one alkali metal carbonate or bicarbonate may be a single carbonate or bicarbonate. Mixtures of alkali metal carbonates and/or bicarbonates may also be employed. In particular it may be advantageous to use a major amount of a carbonate or bicarbonate of one alkali metal (e.g. sodium) in admixture with a minor amount of a carbonate or bicarbonate of an alkali metal of higher atomic number (e.g. potassium).

The polycondensation reaction is normally carried out at temperatures within the range 150° to 400° C., the maximum temperature during polymerisation depending on the polymer being made and its desired properties e.g. molecular weight. In most cases, the maximum temperature during polycondensation is within the temperature range 270° to 370° C. (inclusive).

Where a bisphenol and dihalobenzenoid compound are employed, they should be used in substantially equimolar amounts. An excess of one over the other often leads to the production of low molecular weight products (although this may be desirable in some cases). However a slight excess, up to 5 mol %, of dihalide may usually be employed if desired without incurring low molecular weight products.

The polymerisation reaction may be terminated if desired by mixing a suitable end stopping reagent, e.g. a mono or polyfunctional halide such as methyl chloride, t-butyl chloride or 4,4'-dichlorodiphenylsulphone with the reaction mixture at the polymerisation temperature.

Polymers prepared by the process of the present invention are particularly suitable for use in applications where the polymer is liable to be subject to high service temperatures. Examples of such applications include electrical insulation, e.g. wire coatings, electrical connector mouldings, and cookware coatings.

The invention is illustrated by the following Examples.

EXAMPLE 1

A powder mixture of sodium carbonate (90.0 g, 0.85 mole, all particles of size <500 μm) and a 1:1.01 molar blend (10.0 g, all particles of size <500 μm) derived from 4,4'-dihydroxybenzophenone (21.42 g, 0.100 mole) and 4,4'-difluorobenzophenone (22.04 g, 0.101 mole) was stirred under nitrogen in a glass reaction vessel and heated from 200° C. to 370° C. over 1.5 hours. At 370° C., the reaction medium (which was a free-flowing powder throughout) was poured out of the reaction vessel (leaving a clean reaction vessel surface) and given two washes with hot water (400 ml each). The remaining solid filtered readily and was dried at 120° C.

The product was a polyaromatic ether of repeating unit

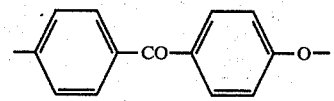

A sample was compression moulded at 400° C. to give tough film.

EXAMPLE 2

A powder mixture of sodium carbonate (90.0 g, 0.85 mole, all particles of size <500 μm), potassium carbonate (2.76 g, 0.02 mole, all particles of size <500 μm) and a 1:1.01 molar blend (10.08 g, all particles of size <500 um) derived from 4,4'-dihydroxydiphenylsulphone (25.03 g, 0.100 mole) and 4,4'-dichlorodiphenylsulphone (24.00 g, 0.101 mole) was stirred under nitrogen in a glass reaction vessel and heated from 200° C. to 300° C. over 1.0 hour. After 3 hours at 300° C., the reaction medium (a white free-flowing powder throughout) was poured out of the reaction vessel (leaving a clean vessel surface) and washed twice with water (400 ml each). The remaining solid filtered readily and was dried at 120° C.

The product was a polyaromatic ether of repeating unit

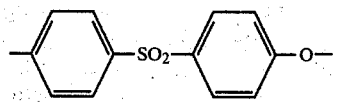

It had a reduced viscosity (as measured at 25° C. on a solution of the polymer in dimethyl formamide, the solution containing 1 g of polymer per 100 cm³ of solution—this method being used in Example 3 as well) of 0.25.

EXAMPLE 3

A powder mixture of potassium carbonate (90.0 g, 0.65 mole, all particles of size <500 μm) and 4-chloro-4'-hydroxydiphenysulphone (10.0 g, 0.037 mole, all particles of size <500 μm) was stirred under nitrogen in a glass reaction vessel and heated from 200° C. to 280° C. over 0.5 hour. After 0.5 hour at 280° C., the reaction medium (a white free-flowing powder throughout) was poured out of the reaction vessel (leaving a clean vessel surface) and given two washes with hot water (400 ml each). The remaining solid filtered readily and was dried at 120° C.

The resulting polymer was a polyaromatic ether of repeating unit

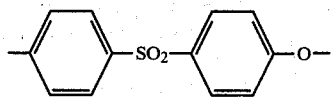

Its reduced viscosity was 0.24.

EXAMPLE 4

A powder mixture of potassium carbonate (90.0 g, 0.65 mole, all particles of size <500 μm) and a 1:1.01 molar blend (10.0 g, all particles of size <500 μm) derived from hydroquinone (11.01 g, 0.10 mole) and 4,4'-difluorobenzophenone (22.03 g, 0.101 mole) was stirred under nitrogen in a glass reaction vessel and heated from 200° C. to 350° C. over 1.5 hours. After 0.5 hour at 350° C., the reaction medium was poured out of the reaction vessel and given two hot water washes (400 ml each). The remaining solid filtered readily and was dried at 120° C.

The resulting polymer was a polyaromatic ether of repeating unit

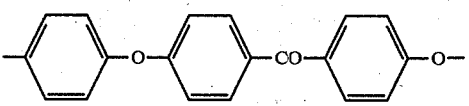

It had a reduced viscosity (as measured at 25° C. on a solution of the polymer in concentrated sulphuric acid of density 1.84 g.cm⁻³, the solution containing 1 g of polymer per 100 cm³ of solution—this method being used in Example 5 as well) of 0.67.

EXAMPLE 5

A suspension of 4,4′-difluorobenzophenone (21.93 g, 0.1005 mole, all particles of size <500 μm), hydroquinone (11.01 g, 0.10 mole, all particles of size <500 μm), sodium carbonate (10.68 g, 0.10 mole, all particles of size <500 μm) and potassium carbonate (0.28 g, 0.002 mole, particle size <500 μm) in chlorobenzene (100 ml) was stirred in a glass reaction vessel at reflux under a nitrogen atmosphere for 1 hour. More sodium carbonate (120 g, 1.13 mole) was added and the temperature raised to 320° C. for 1.0 hour; during this time the chlorobenzene was allowed to distil out leaving at first a paste and then a free-flowing powder. The temperature was finally raised to 350° C. for 0.5 hour after which the free-flowing powder was poured from the vessel and given three hot water washes (400 ml each). The remaining solid filtered readily and was dried at 120° C.

The resulting polymer was a polyaromatic ether of repeating unit

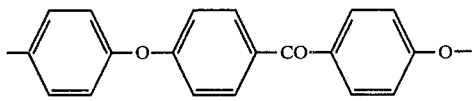

It had a reduced viscosity of 1.54 and was compression moulded at 400° C. to give tough crystalline film.

I claim:

1. A process for the production of an aromatic polyether containing linkages selected from the group consisting of —SO₂— and —CO— groups comprising heating in a reaction vessel, a reaction medium comprising (i) a substantially equimolar mixture of (a) at least one bisphenol and (b) at least one dihalobenzenoid compound, or (ii) at least one halophenol, in which dihalobenzenoid compound or halophenol the halogen atoms are activated by —SO₂— or —CO— groups ortho or para thereto, with at least one alkali metal carbonate or bicarbonate to effect a polycondensation reaction to form the aromatic polyether, the amount of carbonate or bicarbonate being such that there is at least one alkali metal atom for each phenol group present, wherein the polycondensation reaction is carried out in the absence of a solvent and in the presence of a sufficient quantity of an infusible, under the conditions of reaction, particulate substance acting as a support for the polyether which is formed in the polycondensation reaction so as to yield by the end of the polycondensation reaction, a reaction medium in the form of a free-flowing powder which includes the aromatic polyether and the particulate substance and which may be discharged cleanly from the reaction vessel.

2. A process according to claim 1 wherein the infusible support substance used is inorganic.

3. A process according to claim 1 which comprises heating a substantially equimolar mixture of at least one bisphenol selected from the group consisting of hydroquinone and bisphenols having the formula

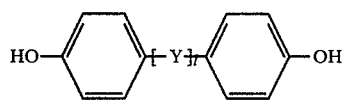

in which l is 0 or 1 and Y is a divalent radical selected from the group consisting of oxygen, sulfur, —SO₂—, —CO—, and divalent hydrocarbon radicals, and at least one dihalobenzenoid compound selected from dihalobenzenoid compounds having the formula

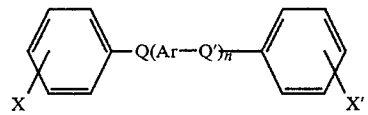

in which X and X′, which may be the same or different, are halogen atoms and are ortho or para to the groups Q and Q′; Q and Q′, which may be the same or different, are —CO— or —SO₂—; Ar is a divalent aromatic radical; and n is 0, 1 or 3.

4. A process according to claim 1 wherein the infusible support substance used is water-soluble.

5. A process according to claim 1 wherein the infusible support substance used is water-insoluble and is retained with the aromatic polyether after work-up.

6. A process according to claim 2 wherein the infusible support substance used is an excess, over substantial stoichiometric, of the alkali metal carbonate or bicarbonate.

7. A process according to claim 1 wherein the reaction medium during the polycondensation reaction is agitated by at least a stirrer.

8. A process according to claim 1 wherein the reaction medium during the polycondensation reaction is agitated by at least the passage of a gas therethrough.

9. A process according to claim 1 wherein the initially charged materials exclude an inert liquid diluent.

10. A process according to claim 1 wherein the initially charged materials include an inert liquid diluent.

11. A process according to claim 3 wherein the at least one dihalobenzenoid compound used is selected from the dihalides having the formula

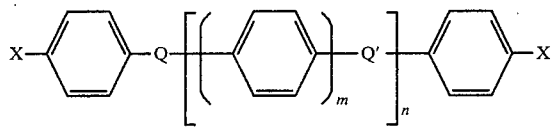

where m is 1, 2 or 3.

12. A process according to claim 1 which comprises heating at least one halophenol selected from halophenols having the formula

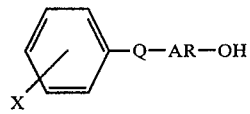

wherein X is halogen and is ortho or para to Q, Q is —SO₂— or —CO—, Ar is an aromatic radical, and —OH is para to the group Q.

13. A process according to claim 12 wherein Ar is a divalent aromatic radical selected from the group consisting of phenylene, biphenylene, and radicals of the formula

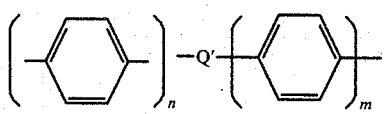

where Q' is —CO— or —SO$_2$— and n and m, which may be the same or different are integers selected from 1, 2 and 3.

14. A process according to claim 3 in which the halophenol is selected from halophenols having the formula

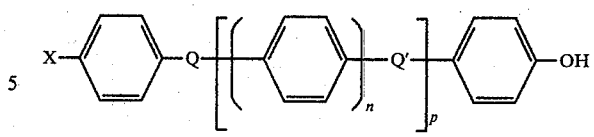

where p is 0 or 1.

15. A process according to claim 1 wherein the polycondensation reaction is carried out within the temperature range 150° to 400° C.

16. A process according to claim 15 wherein the maximum temperature during the polycondensation is within the temperature range 270° to 370° C.